United States Patent [19]

Heywood et al.

[11] 4,326,351

[45] Apr. 27, 1982

[54] DISPLAY DEVICES

[76] Inventors: Joseph R. Heywood, 118 Morgan St., Kingsgrove, New South Wales; Leonard H. Ainsworth, 108 Dunning Ave., Rosebery, New South Wales, both of Australia

[21] Appl. No.: 155,752

[22] Filed: Jun. 2, 1980

[30] Foreign Application Priority Data

Nov. 6, 1979 [AU] Australia ............................ PD9145

[51] Int. Cl.³ ...................... G09F 11/12; G09F 11/18; A63B 71/00; G01D 9/00

[52] U.S. Cl. ........................................ 40/467; 40/472; 40/525; 273/138 A; 116/278

[58] Field of Search ................. 40/472, 467, 525, 524, 40/528, 466, 514, 515; 194/41, 50, 76, 81, 89; 273/138 A, 143 R; 116/278; 160/86; 226/181, 186

[56] References Cited

U.S. PATENT DOCUMENTS 1,785,442 12/1930 Fisher et al. ......................... 40/525
1,843,479 2/1932 Caille ................................ 116/278
3,266,457 8/1966 Morgan .............................. 116/278
3,910,582 10/1975 Richards ......................... 273/143 R
4,037,845 7/1977 Hooker ........................... 273/138 A
4,095,795 6/1978 Saxton et al. ................... 273/138 A

*Primary Examiner*—Robert Peshock
*Assistant Examiner*—Michael J. Foycik
*Attorney, Agent, or Firm*—Holman & Stern

[57] ABSTRACT

A display device for a machine such as a poker machine or fruit machine in which information to be displayed is arranged on a closed loop of flexible strip material arranged to pass in front of a viewing window. The closed loop is moved around the predetermined path by electric motors for example. The closed loop can be stopped or started as required and when in motion its position is sensed by an electronic sensor, the output of which is fed to a microprocessor. In a poker or fruit machine a number of such loops of flexible strip material are arranged side by side in a casing which may have the appearance of a conventional fruit machine or poker machine.

13 Claims, 2 Drawing Figures

DISPLAY DEVICES

BRIEF SUMMARY OF THE INVENTION

The present invention relates to a display device for machines in which information is required to be displayed in response to some input to the machine.

An important application of the invention is in coin operated amusement machines, more commonly known as Fruit or Poker machines, and, by way of example the invention will be described in its application to such machines, the operation of which is usually based on a multiplicity of drums usually 3, 4 or 5, mounted adjacent to each other in a cabinet and viewed by the player through a window. Inscribed on the outer periphery of these drums is a series of symbols usually depicting various kinds of fruits or playing cards.

The player inserts a coin into the machine which allows a game to be played usually, by either pulling a lever or pressing a button. This action causes the drums to spin in unison and stop at random one by one in a predetermined sequence. Each drum has a number of like symbols inscribed upon its periphery and should a given number of the same symbols come to rest adjacent to each other a winning combination is formed and a prize is usually paid out automatically or credited on a meter; the value of the prize varies according to the value given to the combination of symbols displayed.

Problems are inherent in the design of such machines arising from (a) the mechanism required to spin the drums; (b) the mechanism required to stop them; (c) the mechanism needed to decode the symbols inscribed on the drums so that when a winning combination shows in the viewing window it can be identified and the correct value of prize be paid out; (d) the cost of the mechanisms needed to achieve these functions; (e) the complexity of these mechanisms.

There are many ways in which these problems are overcome, some mechanically and some electronically and some by a mixture of both technologies.

In known coin operated amusement machines, drums are used to display the symbols because, although various other systems of displaying symbols, such as projecting images on a screen or depicting them electronically have been proposed, they have been found unacceptable to the players of such machines due possibly to their contrived and artificial appearance.

It would seem that players prefer to see the actual symbols rotating on the periphery of a drum; apart from the excitement this movement itself creates, there is visual evidence that the symbols do exist in a fixed sequence and cannot be tampered with. Other systems where no such visual evidence exists are suspected of being the subject of unfair prior programming which could determine the frequency of winning combinations to the detriment of the player.

Bearing these facts in mind it is considered that any improved design of such machines should incorporate the principle of displaying the symbols in such a manner that a player can see that they exist in an unalterable sequence, if the machine is to be commercially acceptable.

An object of the present invention is to provide a display device for such machines complying with this basic requirement whilst overcoming some of the problems associated with known machines.

The present invention consists in a display device for a machine in which information is to be displayed, the device consisting of a display unit consisting of a closed loop of flexible strip material having on it a series of indicia spaced around the loop, means supporting said loop, means for guiding said loop in motion around a closed path, means for initiating motion of the loop and means for arresting motion of the loop, a viewing window through which at least one of said indicia on the loop can be viewed, drive means for transporting said loop around its path, electronic means for sensing the position of the loop around its said path, means for controlling said motion initiating and arresting means whereby said loop is caused to move around said path and is brought to a halt with a predetermined or randomly selected indicium visible in said window. It is preferred that that portion of the path of the loop which is visible through said viewing window is curved so that the loop in motion gives the appearance of the periphery of a drum passing the window. It is preferred that the unit is in the form of a self contained cassette separately removeable from a machine.

It is preferred that a plurality of display devices as defined above be arranged side by side on a common base, the display unit sharing a common viewing window and sharing a common drive means.

Thus the present invention does not use a wheel or drum to display the symbols but in preferred forms presents to the player the illusion that the symbols are in fact inscribed on a rotating drum.

It is to be observed that the use of a drum to display the symbols means that, however light the construction, there is always the mass of the drum to overcome to spin it at a desirable speed and conversely to stop it. This is overcome in certain machines by using an electric motor to drive the drums through a system of clutches but such systems suffer from a slower than desirable spinning speed. Such systems, due to this complexity, are costly to make and the present invention is considered to be capable of being constructed in a form in which these costs can be much reduced.

BRIEF DESCRIPTION OF THE SEVERAL VIEWS OF THE DRAWINGS

In order that the the invention may be better understood and put into practice a preferred form thereof is hereinafter described by way of example with reference to the accompanying drawings in which.

DETAILED DESCRIPTION

Figure 1:
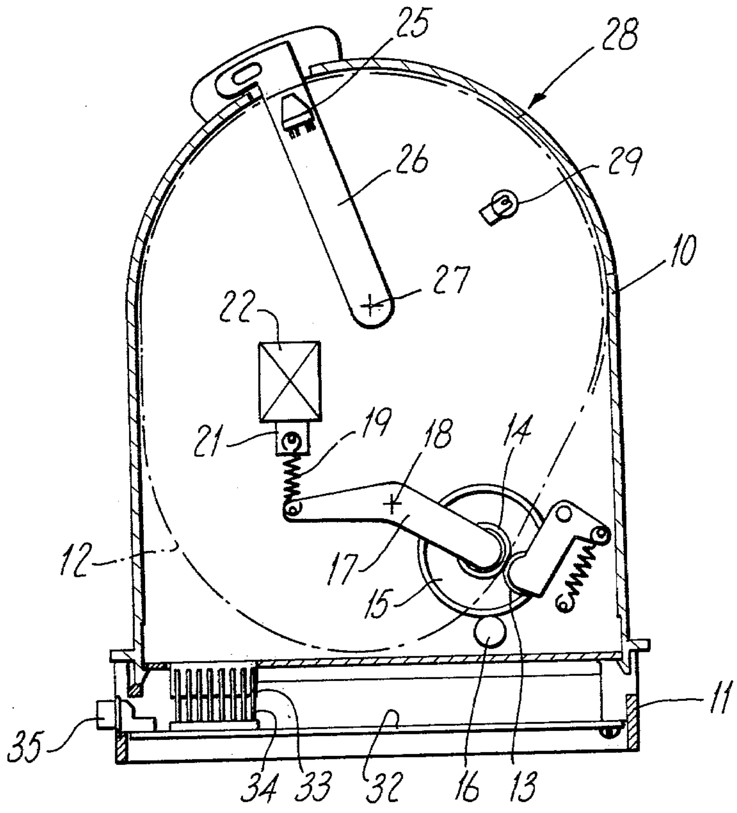
FIG. 1 is a cross sectional view of a display device according to the invention.

The display device shown in FIG. 1 is in the form of what may be described as a plug-in cassette. The cassette consists of a housing 10 mounted on and attached to a base 11. The housing 10 and the base 11 are preferably formed by moulding from plastic material and they can thus be constructed acurately but inexpensively. The upper part of the housing 10 is semi-circular and the smooth internal surface of the housing defines the path of a band 12 of a light but stiff and strong plastic strip. This strip, in the lower part of its travel, passes between a spring loaded pinch roller 13 and a rubber tyred drive wheel 14. The drive wheel 14 is mounted on and coaxial with a rubber tyred driven wheel 15 which is driven from the drive shaft 16 with which it is in frictional engagement. The wheels 14 and 15 are carried on an arm 17 that is pivoted at 18. The end of the arm 17 is connected through a spring 19 to the armature 21 of the solenoid 22. In the position shown in FIG. 1 the band 12 is gripped between the pinch roller 13 and the drive wheel 14; the driven wheel 15 is held in contact with the drive shaft 16 so that drive is transmitted to the band 12 which is caused to rotate around a closed path. Operation of the solenoid 22 to extend the armature 21 causes the driven wheel 15 to come out of contact with the drive shaft 16 thereby removing drive from the band 12 which will, owing to its very low inertia stop substantially instantaneously. Reapplication of the drive by operation of solenoid 22 will restart movement of the band 12.

Figure 2:
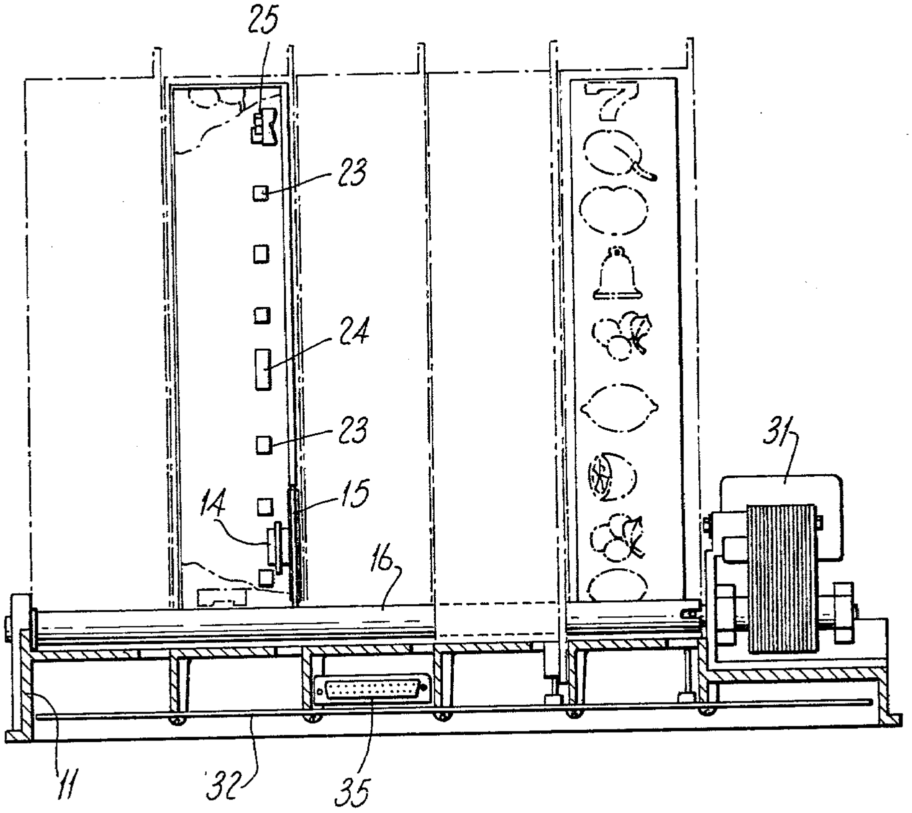
FIG. 2 is a front view showing an arrangement in which five devices of the kind shown in FIG. 1 are mounted side by side on a common base.

The band 12 has a set of symbols silk-screened onto its outer face which, as shown in FIG. 2 can consist of representations of different types of fruit. In the particular embodiment of the invention shown in the drawings the inner surface of the band 12 is white and it has printed on the white background a series of coding marks 23 in black. One mark 24 is made longer than the others to provide a zero or reset position which can be readily identified. One code mark is provided in respect of each symbol and is in a predetermined relationship with that symbol.

Within the housing 10 there is mounted a code reading unit 25 which is fixed to an arm 26 pivoted at 27 and capable of a small amount of angular adjustment. The code reading unit 25 is a well known article of commerce consisting of a source of radiation, for example infra-red radiation and a receiver of radiation, for example a photo-diode. As the band 12 rotates the white segments between the black coding marks 23 reflect the light beam from the transmitter of the code reading unit 25 back to its receiver. However, when a coding mark passes the code reading unit 25 the beam is not reflected and thus an electrical pulse is produced each time a coding mark passes a code reading unit.

The band 12 is visible externally through a viewing window 28 which is arranged over part of the curved path of the band. A source of illumination 29 is arranged inside the band at this point to illuminate symbols appearing in the viewing window 28.

In FIG. 2 five plug-in cassettes such as that illustrated in FIG. 1 are arranged side by side on a common base 11 and the driving shaft 16 is common to all cassettes being driven by the electric motor 31. Within the base 11 is mounted a microprocessor, the printed circuit board of which is indicated at 32. Each cassette has on it a socket 33 engaging pins 34 extending upwardly from the printed circuit board 32. The microprocessor unit is provided with an inlet and outlet socket 35 by means of which external connections may be made to it. The code reading unit 25 of each cassette is connected to the microprocessor circuit by means of connections which are not shown.

The whole arrangement shown in FIG. 2 is contained within a cabinet which may be identical with cabinets such as are ordinarily used for coin operated amusement machines. Associated with the cabinet is the usual coin receptacle, means for dispensing coins as prizes and means for initiating operation of the machine by pulling a handle or pushing a button. As all of these devices are well known in the art it is unnecessary to illustrate them or describe them in any detail. To a player, a machine incorporating a display unit according to the invention need look no different from a conventional machine.

The operation of a coin operated amusement machine incorporating the invention is as follows:

When a coin is inserted and the starting handle or button is operated the motor 31 driving the drive shaft 16 starts up. This rotates the drive shaft 16 and at the same time the solenoids 22 in each of the cartridges are energised pulling their respective levers 17 upwards until the rubber tyred driven wheels 15 engage the drive shaft 16. The drive wheels 14 will then start to rotate. This will in turn cause the bands 12 to be driven around the interior of the casings 10.

As each band 12 passes the viewing window 28 it will give to a player the impression of a wheel or drum spinning, as the symbols imprinted on it will pass the viewing window at some speed.

During the course of the band 12 moving in such a manner the code marks 23 on the band, one corresponding to each symbol, will cause the code reading unit to produce a pulse as each symbol passes. This unit is connected to the microprocessor unit which will count each symbol as it passes the unit. The reset coding mark 24 will produce one pulse per complete revolution of the band and this tells the electronic circuit when to start counting. The circuit will then know exactly what symbol is in the viewing window at any given time as the pulse count will be constantly compared with a predetermined programme of the disposition of the symbols on the band.

When each band has rotated in this manner for the correct length of time the electronic circuit will stop each one in the correct sequence but in a random manner. To ensure the bands all stop with their respective symbols in the correct relationship with each other, i.e. a straight line-up, when the stop signal is sent the band will stop immediately the next pulse is received, by de-energising its solenoid. This will cause the band to stop accurately each time regardless of what symbol is in the viewing window.

The position of each code reading unit 25 is adjustable in the manner described so that the stop position of each band can be accurately lined up with the one adjacent to it ensuring a perfect line up of all symbols. As the microprocessor will know what symbol on each loop is in the viewing window it will then be able to compare this information with a predetermined programme and identify whether or not a winning combination has been obtained. It can then initiate the correct value of prize to be paid out if a prize has been won.

The use of microprocessor units in controlling the operation of coin freed amusement machines is well established and it is therefore not necessary to describe a particular microprocessor unit or a particular programme, as these do not form part of the present invention and considerations involved in design and construction of such units and the devising of such programmes are well understood by those skilled in the art. It is to be noted that while an arrangement for code sensing involving reflected light is described an arrangement in which transmitted light passes through holes in the band could be used equally well.

It is considered that the manufacturing costs of such a simple arrangement will be minimal. It will also be seen that as each unit is in the form of a simple "plug-in" cassette, service of the device as a whole becomes mainly a replacement task, eliminating the need for highly skilled labour in the field. Because there is no movement involved of any component of significant weight or mass, wear will be minimal. The electronic control of the bands will mean that any number of configurations of symbols and symbol values can be easily achieved. The bands can be of varying lengths and widths and any number of symbols can be used. While the invention has been described in its application to a coin freed amusement machine it has a variety of other applications and in this connection it is to be noted, for instance, that the symbols can be alphabetical or numerical and when a number of units are mounted adjacent to each other words or numbers could be assembled in any reasonable configuration making the invention very useful for a variety of purposes.

I claim:

1. A display device for an amusement or game machine wherein a series of indicia on a movable member are viewed through a window in a housing of the machine comprising a housing member formed by walls enclosing a space, a base supporting said housing, at least one window through a wall of said housing, at least one endless, flexible, closed loop tape disposed within said housing, a series of indicia on at least one surface of said tape, drive means for driving said tape around its closed loop path, means for supporting and guiding said tape past the inside of said window so that at least one of said indicia can be viewed therethrough, means for starting and stopping said drive means, electronic sensing means for sensing the position of said tape with respect to its path of travel, and control means operatively associated with said sensing means for controlling said starting and stopping means in response to said sensing means whereby said tape is stopped in a predetermined position with at least one of said indicia in said window.

2. The device as claimed in claim 1 wherein said drive means comprises a pinch roller mechanism operatively engaging the opposite sides of said tape, a drive wheel for driving at least one of the rollers of said pinch roller mechanism, a drive shaft for driving said drive wheel, and means for driving said drive shaft, said starting and stopping means engaging said drive wheel with said drive shaft and disengaging said drive wheel from drive shaft, respectively.

3. The device as claimed in claim 2 wherein said pinch roller mechanism comprises a tape drive roller operatively connected to said drive wheel, a tape drive roller support arm pivotally mounted between the ends thereof on said housing and having said tape drive roller rotatably mounted on one end thereof, a solenoid operatively connected to the other end of said support arm, a pinch roller support arm pivotably mounted between its ends on said housing, a pinch roller rotatably mounted on one end of said pinch roller support arm and means urging said pinch roller into engagement with said tape drive roller with said tape therebetween, said starting and stopping means comprising said solenoid being operatively connected to said control means, so that in one position of said solenoid the drive wheel engages said drive shaft and in the other position of said solenoid the drive wheel is disengaged from said drive shaft.

4. A display device as claimed in claim 2 or 3 wherein that portion of the path of the tape in which the tape is visible through said viewing window is curved so that the tape in motion gives the appearance of the periphery of a drum passing the window.

5. A display device as claimed in claim 4 wherein said means for supporting and guiding said tape over said curved portion of its path comprises a smooth inner curved surface of said housing at least adjacent said window.

6. A display device as claimed in any one of claims 1, 2 or 3 wherein said electronic sensing means for sensing the position of said tape comprises means for projecting a ray of light on to said tape, means for receiving light passing through said tape and at least one code means on said tape for each of said indicia responsive to said ray of light so that an electrical pulse is produced in said receiving means on the passage of each said code means past said ray of light.

7. A display device as claimed in claim 6 wherein said code means include at least one code means to produce one distinguishable pulse in said receiving means for each rotation of said tape.

8. A display device as claimed in any one of claims 1, 2 or 3 wherein said housing is moulded from plastic material, and means for demountably attaching said housing to said base.

9. A display device as claimed in any one of claims 1, 2 or 3 wherein a plurality of closed loop tapes and drive means and separate windows therefore are mounted side by side on said base.

10. A display device as claimed in claim 9 including microprocessor means to receive and process pulses produced by said electronic means.

11. A display device as claimed in claim 2 or 3 wherein a plurality of said closed loop tapes, separate viewing windows and separate pinch roller mechanisms therefore are mounted side by side on said base and said drive wheels are driven by a common drive shaft.

12. A display device as claimed in claim 11 wherein each of said closed loop tapes and pinch roller mechanisms is in the form of a cassette which is removably insertable in said housing member so that the drive wheel of each is engageable with said drive shaft.

13. A display device as claimed in any one of claims 1, 2 or 3 wherein said electronic sensing means for sensing the position of said tape comprises means for projecting a ray of light on to said tape, means for receiving light reflected from said tape and at least one code means on said tape for each of said indicia responsive to said ray of light so that an electrical pulse is produced in said receiving means on the passage of each said code means past said ray of light.

* * * * *